United States Patent
Melin et al.

(10) Patent No.: US 9,348,107 B2
(45) Date of Patent: May 24, 2016

(54) TOOL FOR OPENING AN EXTRUDED PROFILED BODY OF A POWER CORD ASSEMBLY DEVICE

(71) Applicant: ABB Technology Ltd, Zürich (CH)

(72) Inventors: Torbjörn Melin, Karlshamn (SE); Jimmy Sacklin, Lyckeby (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/786,629

(22) PCT Filed: Jun. 19, 2013

(86) PCT No.: PCT/EP2013/062794
§ 371 (c)(1),
(2) Date: Oct. 23, 2015

(87) PCT Pub. No.: WO2014/202136
PCT Pub. Date: Dec. 24, 2014

(65) Prior Publication Data
US 2016/0085043 A1    Mar. 24, 2016

(51) Int. Cl.
*G02B 6/44* (2006.01)
*G02B 6/46* (2006.01)
*H01B 9/00* (2006.01)

(52) U.S. Cl.
CPC ............ *G02B 6/4497* (2013.01); *G02B 6/4416* (2013.01); *G02B 6/46* (2013.01); *H01B 9/005* (2013.01)

(58) Field of Classification Search
CPC ...... G02B 6/4497; G02B 6/4416; G02B 6/46; H01B 9/005
USPC .......................................................... 385/101
See application file for complete search history.

(56) References Cited

U.S. PATENT DOCUMENTS

| | | | | | |
|---|---|---|---|---|---|
| 4,494,822 | A | * | 1/1985 | Harvey | G02B 6/4422 174/50.53 |
| 4,623,218 | A | * | 11/1986 | Laurette | G01M 11/30 385/101 |
| 4,723,832 | A | * | 2/1988 | Okazato | G02B 6/4416 174/70 A |
| 4,793,686 | A | * | 12/1988 | Saito | G02B 6/4407 385/101 |

(Continued)

FOREIGN PATENT DOCUMENTS

SE    530 277 C2    4/2008

*Primary Examiner* — Ryan Lepisto
*Assistant Examiner* — Guy Anderson
(74) *Attorney, Agent, or Firm* — Birch, Stewart, Kolasch & Birch, LLP

(57) ABSTRACT

A tool for opening an extruded profiled body of a power cord assembly device includes at least one pair of guides and at least one support, the pair of guides and the support being arranged in a frame, wherein a first guide of the pair of guides is arranged and shaped to releasably connect to the an interconnection area of the profiled body, and wherein a second guide of the pair of guides is arranged and shaped to releasably connect to a second interconnection area of the profiled body, said support being provided with a support member adapted to bear against a portion of the first wall opposite to a slit in the profiled body, the distance of the pair of guides relative to the support being such that the slit is widened in the area of the elongation of the profiled body where the tool is applied, thereby allowing a fiber optic cable to be introduced into the chamber.

23 Claims, 11 Drawing Sheets

(56) References Cited

U.S. PATENT DOCUMENTS

| | | | | |
|---|---|---|---|---|
| 4,952,012 A * | 8/1990 | Stamnitz | G02B 6/4416 | 385/101 |
| 4,993,805 A * | 2/1991 | Abe | G02B 6/4416 | 174/70 R |
| 5,245,740 A * | 9/1993 | Araki | B65H 51/00 | 254/134.3 FT |
| 5,268,971 A * | 12/1993 | Nilsson | G02B 6/4407 | 385/101 |
| 5,448,669 A * | 9/1995 | Dunn | G02B 6/4416 | 174/117 R |
| 5,825,957 A * | 10/1998 | Song | G02B 6/4407 | 385/110 |
| 6,091,025 A * | 7/2000 | Cotter | G02B 6/4416 | 174/110 R |
| 6,195,487 B1 * | 2/2001 | Anderson | G02B 6/4416 | 174/23 R |
| 6,195,488 B1 * | 2/2001 | Song | G02B 6/4416 | 385/101 |
| 6,236,789 B1 * | 5/2001 | Fitz | G02B 6/4416 | 385/100 |
| 6,239,379 B1 * | 5/2001 | Cotter | G02B 6/4416 | 174/110 R |
| 6,241,920 B1 * | 6/2001 | Cotter | G02B 6/4416 | 264/1.24 |
| 7,160,032 B2 * | 1/2007 | Nagashima | G02B 6/4201 | 385/101 |
| 7,574,086 B2 * | 8/2009 | Oh | G02B 6/4464 | 174/113 AS |
| 2005/0053460 A1 * | 3/2005 | Czachor | F01D 5/082 | 415/116 |
| 2005/0286844 A1 * | 12/2005 | Lee | H01B 9/005 | 385/109 |
| 2011/0280527 A1 * | 11/2011 | Tamura | G02B 6/4433 | 385/101 |
| 2013/0233612 A1 * | 9/2013 | Pimentel | H02G 3/04 | 174/545 |

* cited by examiner

TOOL FOR OPENING AN EXTRUDED PROFILED BODY OF A POWER CORD ASSEMBLY DEVICE

TECHNICAL FIELD

The present invention relates to a tool for opening an extruded profiled body of a power cord assembly device. It also relates to such an extruded profiled body and a method of introducing a fibre optical cable into a power cable assembly device.

BACKGROUND OF THE INVENTION

When putting a fibre optic cable inside a power cord assembly device with the prior art tools, it has proven complicated to perform the operation, and is thus time consuming.

A tool for opening an extruded profiled body of a power cord assembly device is known from SE-C2-530 277. It is cumbersome to use, since the tool must be introduced into the same a slit of the power cord assembly where the fibre optic cable is to be introduced.

OBJECT OF THE INVENTION

The object of the present invention is to improve the accessibility to a chamber of the profiled body, where the fibre optic cable is to be introduced.

SUMMARY OF THE INVENTION

This has been solved by a tool for opening an extruded profiled body of a power cord assembly device as initially defined, which further comprises at least one pair of guide means and at least one support means, said pair of guide means and said support means being arranged in a frame, wherein a first guide means of said pair of guide means is arranged and shaped to releasably connect to the an interconnection area of the profiled body, and wherein a second guide means of said guide means is arranged and shaped to releasably connect to a second interconnection area of the profiled body, said support means being provided with a support member adapted to bear against a portion of the first wall opposite to the slit,
the distance of the guide means relative to the support means being such that the slit is widened in the area of the elongation of the profiled body where the tool is applied, hereby allowing a fibre optic cable to be introduced into the chamber.

Hereby, damages on the fibre optic cable are avoided. Furthermore, the introduction is made easier and faster and is thus less expensive.

It has also been achieved by a power cable assembly of the initially defined kind, furthermore comprising a profiled body made of a polymer material and adapted to the cross-sectional shape and elongation of the power cable, said profiled body (4) comprising a chamber and a slit to said chamber, said chamber being adapted to receive a fibre optic cable via said slit.

Hereby is achieved a profiled body suitable to be used in said tool

It has furthermore been achieved by the method of the initially defined kind, including the steps of
applying a pressure on the first wall substantially between the first and second end portions in a direction towards the slit;
applying a pressure on at least one of said second and third wall in a direction towards the first wall until the slit is wider than the diameter of the fibre optic cable; introducing the fibre optic cable through the slit into the chamber;
placing a guide means along the longitudinal extension of the slit, the guide means having an elongated guide member with two elongated sides, the lateral dimension of the elongated guide member being less that the diameter of the fibre optic cable;
controlling and guiding the fibre optic cable into the chamber via said slit by means of the guide member;
moving the profiled body in relation to the guide means together with the fibre optic cable;
moving the guide member out of the slit, the fibre optic cable (30) remaining inside said chamber.

Hereby, as safe method is defined for readily and easily introducing a fibre optic cable into the chamber of the profiled body.

Suitably, said support means is rigidly connected to the frame, said guide means being movably connected to the frame by means of a helical joint, a gear rack joint or a sliding joint.

Preferably, the first and second guide means are provided with friction reducing means adapted bear against and slide along the profiled body in the vicinity of the first interconnection area and the second interconnection area, respectively, for facilitating movement in the longitudinal extension of the profiled body. Suitably, the friction reducing means is a movable member. In particular the movable member is a ball, a roll or a wheel.

Suitably, said support member of is provided with friction reducing means adapted bear against and slide along the outer surface of the first wall of the profiled body, for facilitating movement in the elongation of the profiled body. Preferably, the friction reducing means is a movable member. In particular, the movable member is a ball, a roll or a wheel.

Preferably, the number of pairs of guide means is at least two, and the number of support members is at least two. In particular, the number of pairs of guide means is four, and the number of support members is at least four. Hereby, a controlled introduction of the fibre optic cable into the chamber is achieved.

Suitably, a guide bar is provided for guiding the fibre optic cable into the slit, wherein the guide bar is provided with a guide member the transversal dimension of which being less than the width of the slit. Hereby, a controlled guiding of the optic fibre to remain in the chamber is achieved.

Preferably, the guide bar is provided with a U-shaped guide member for controlling the introduction of the fibre optic cable into the slit, said U-shaped guide member being aligned with the elongated guide member, the guide bar being connected to the frame in front of and facing the guide members, the open part of the U-shaped guide member being turned towards at least one of the support members in such a way that the U-shaped guide member and the elongated guide member are facing the slit of a profiled body introduced between the support members and the guide means, the guide bar being positioned in the frame such that the U-shaped guide member is upstream the elongated guide bar in relation to the direction of movement of the profiled body.

It is now referred to the power cable assembly device as defined above. In particular the cross-section of the profiled body includes a first wall, a second wall and a third wall said first wall being convex and having first and second opposite end portions, said second wall being concave and having third and fourth opposite end portions, said third wall being concave and having fifth and sixth end portions, the third end portion of said second wall being connected to said first end portion of said first wall, the fifth end portion of said third wall being connected to said second end portion of the first wall, the first wall being adapted to face a jacket of the power cable, said a second and a third walls being adapted to face a pair of neighbouring power cores, wherein the fourth end portion of the second wall and the sixth end portion of the third wall define together a slit to a chamber between said first, second and third walls, said slit extending in the elongation of the profile for allowing introduction of a fibre optic cable into said chamber.

Suitably, the cross-section of the chamber is substantially annular.

Suitably, the polymer material of the profiled body is PVC or PE.

The elongated slit may be closed in a mounted state.

Preferably, the diameter of the chamber is in the range 11-25 mm, more preferably 13-23 mm.

The slit may be open in a mounted state, and the distance between the fourth end portion of the second wall and the sixth end portion of the third wall defining the slit is in the range 1 mm-13 mm, more preferably 3-11 mm, even more preferably 4-6 mm, most preferably 5 mm.

Preferably, the diameter of the chamber is in the range 11-25 mm, more preferably 12-23 mm.

Preferably, the wall thickness of either or all of the second wall, the third wall and a wall defining the chamber has a thickness in the range of 2-6 mm, more preferably 2.5-4 mm, most preferably 3 mm.

In the method the fibre optic cable may be controlled to be inserted into the chamber by a U-shaped guide member and is guided to remain inside the chamber by an elongated guide member.

Hereby, a controlled introduction of the optic fibre cable into the chamber is achieved.

DRAWING SUMMARY

In the following, the invention will be described in more detail by reference to the enclosed drawings, in which FIG. 1 is a cross-section of a power cable assembly device;

DETAILED DESCRIPTION

Figure 1:
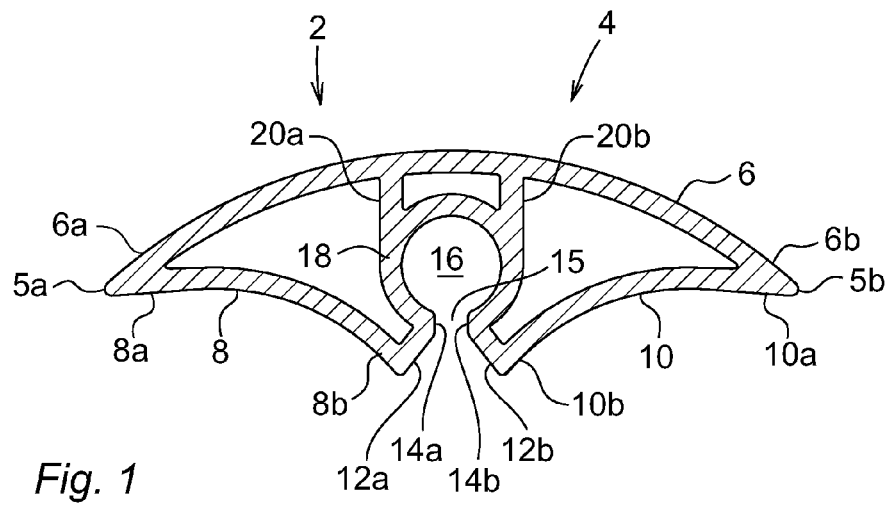

FIG. 1 shows a power cable assembly device 2 in the form of an extruded profiled body 4 with a first wall 6, a second wall 8, a third wall 10. The first wall 6 is convex while the second and third walls 8, 10 are concave, the reason for which will be discussed farther below. The cross-section of the profiled body has first and second end portions 5a, 5b, opposite to one another.

The cross-section of the first wall 6 of has a first end 6a and a second end 6b. Likewise, the second wall 8 has a first end 8a and a second end 8b, and the third wall 10 has a first end 10a and a second end 10b. The first end 6a of the first wall 6 is connected to the first end 8a of the second wall at the first end 5a of the profiled body, while the second end 6b of the first wall 6 is connected to the first end 10a of the third wall 10 at the second end 5b of the profiled body.

The second end 8b of the second wall 8 continues to a first angled transition 12a and further to a first radial transition 14a. Likewise, the second end 10b of the third wall 10 continues to a second angled transition 12b and further to a second radial transition 14b.

The first and second angled transitions 12a, 12b are converging towards the first and second radial transitions 14a, 14b, the latter being substantially parallel to one another and thus substantially radial to the convex first wall 6. The first and second radial transitions 14a, 14b are arranged at a distance from one another, defining an open slit 15.

Inside the profiled body 4, a chamber 16 defined by a substantially annular wall 18 is arranged. The annular wall 18 extends from the first radial transition 14a to the second radial transition 14b. A pair of reinforcement members 20a, 20b are arranged between the annular wall 18 and the first wall 6.

The assembly device 2 is made by extrusion of a polymer material, such as PE (e.g. MDPE or HDPE) or PVC and may have a length of several kilometers.

At least the second and third walls 8, 10 have a thickness in the range 2-6 mm, more preferably 2.5-4 mm, most preferably 3 mm, and thin layer 21 of the semi-conductive material is in the range 0.01-0.5 mm, more preferably 0.05-0.35 mm, even more preferably 0.1-0.3 mm, even more preferably 0.15-0.25 mm, most preferably 0.2 mm.

Figure 2:
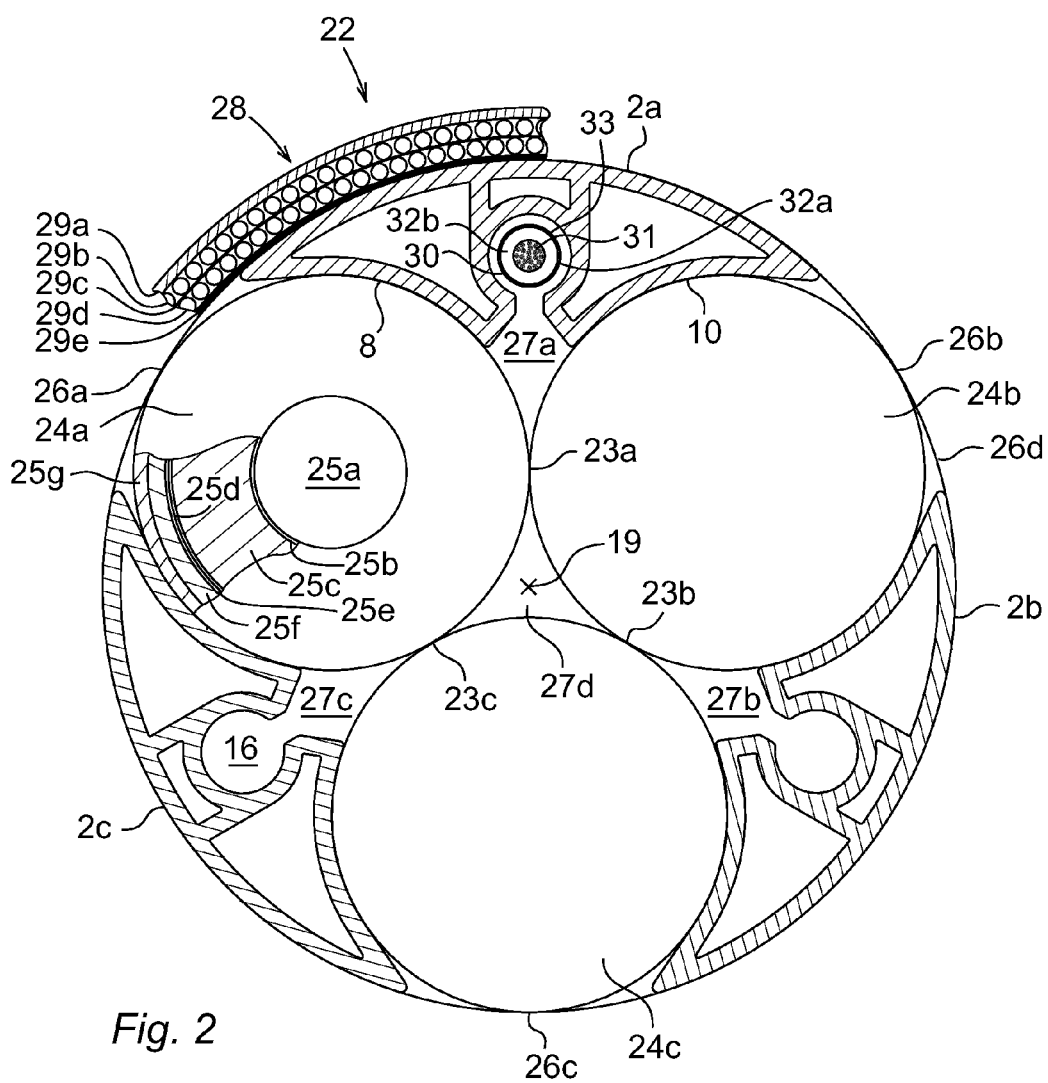
FIG. 2 is a cross-section of a power cable provided with the power cable assembly device shown in FIG. 1.

FIG. 2 shows the interior of a power cable 22 provided with three neighbouring first, second and third power cores 24a, 24b, 24c, each provided—from the centre to the periphery—with a conductor 25a, a first second semi-conductive layer 25b, insulation 25c, a second semi-conductive layer 25d, a layer of swelling material 25e, a metal screen 25f made of led and a third semi-conductive mantle 25g.

The first and second semi-conductive layers 25b, 25d form a smooth surface which controls the electric field strength. The swelling material 25e tightens against water in case the led screen 25f would start leaking.

Each power core 24a, 24b, 24c has a peripheral point 26a, 26b, 26c in relation to the diametrical centre 19 of the power cable 22, i.e. in the central space 27d. The three peripheral points 26a, 26b, 26c form together in relation to the centre point 19 an imaginary circle 26d.

The first and second power cores 24a, 24b touch one another at a contact point 23a and define a peripheral space 27a together with the imaginary circle 26d. Likewise, the second and third power cores 24b, 24c have a contact point 23b and define a second peripheral space 27b together with the imaginary circle 26d and the third and first power cores 24c and 24a have a contact point 23c and define a third peripheral space 27c together with the imaginary circle 26d. The first, second and third power cores 24a, 24b, 24c define between the contact points 23a, 23b, 23c a central space 27d.

In the peripheral space 27a, a first assembly device 2a is provided. Likewise, a second assembly device 2b is arranged in the second peripheral space 27b, and a third assembly device 2c is arranged in the third peripheral space 27c.

The power cable is provided with a jacket 28 to keep the power cores 24a, 24b, 24c and the assembly devices 2a, 2b, 2c together as one unit and to keep the circular cylindrical shape and mechanical protection. The jacket 28 comprises—from the periphery towards the centre point 19—two layers 29a of yarn made of polypropylene (PP), a first steel wire armour layer 29b, a first soft layer 29c of laying bands, a second steel wire armour layer 29d, a second soft layer 29e of laying bands.

As can be understood from FIG. 2, the concavity of the outer surface of the second and third walls 8, 10 of each assembly device 2a, 2b, 2c depends on the diameter of the power cores 24a, 24b, 24c. In the same manner, the convexity of the outer surface of the first wall 6 of each assembly device 2a, 2b, 2c depends on the radius of curvature of the imaginary circle 26d.

An elongated a fibre optic cable 30 comprises a fibre optic wave conductor 31, i.e. a bundle of optical fibres inside a metal tubing 32a together with a mass 32b, such as a gel. The metal tubing 32a is covered with a layer of semi-conductive layer 33.

Figure 3:
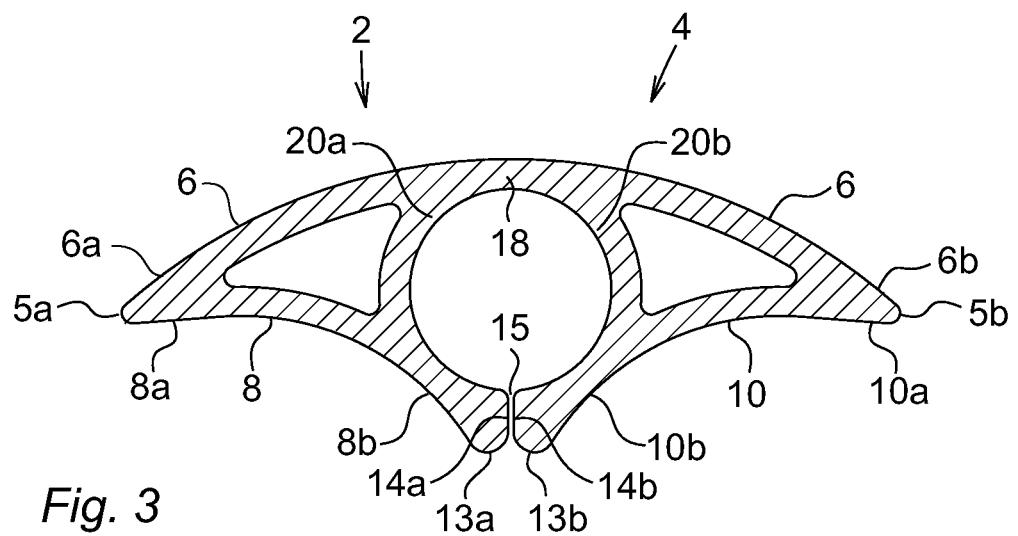
FIG. 3 is a cross-section of an alternative power cable assembly device.

FIG. 3 shows another assembly device 2 made by extrusion of a polymer material, such as PE (e.g. MDPE or HDPE) or PVC.

Also in this embodiment, the first wall 6 of the profiled body 4 is convex and has first and second ends 6a, 6b; the second wall 8 is concave and has first and second ends 8a, 8b; and the third wall 10 is concave and has first and second ends 10a, 10b. The first, second and third walls are connected to one another as described in connection with FIG. 1 above.

However according to this embodiment, the second end 8b of the second wall 8 continues to a first curved transition 13a and further to a first radial transition 14a. Likewise, the second end 10b of the third wall 10 continues to a second curved transition 13b and further to a second radial transition 14b. Also in this embodiment the first and second radial transitions 14a, 14b are substantially parallel to one another and are thus substantially radial to the convex first wall 6.

However, according to this embodiment, the first and second radial transitions 14a, 14b are arranged without distance from one another, i.e. the slit 15 is closed, even though the slit for clarity reasons have been shown to be somewhat open.

Also in this embodiment, the annular wall 18 defining the chamber 16 extends from the first radial transition 14a to the second radial transition 14b. However, no further reinforcement members are needed. Instead, the annual wall 18 is partly constituted by the first wall 6.

Figure 4A:
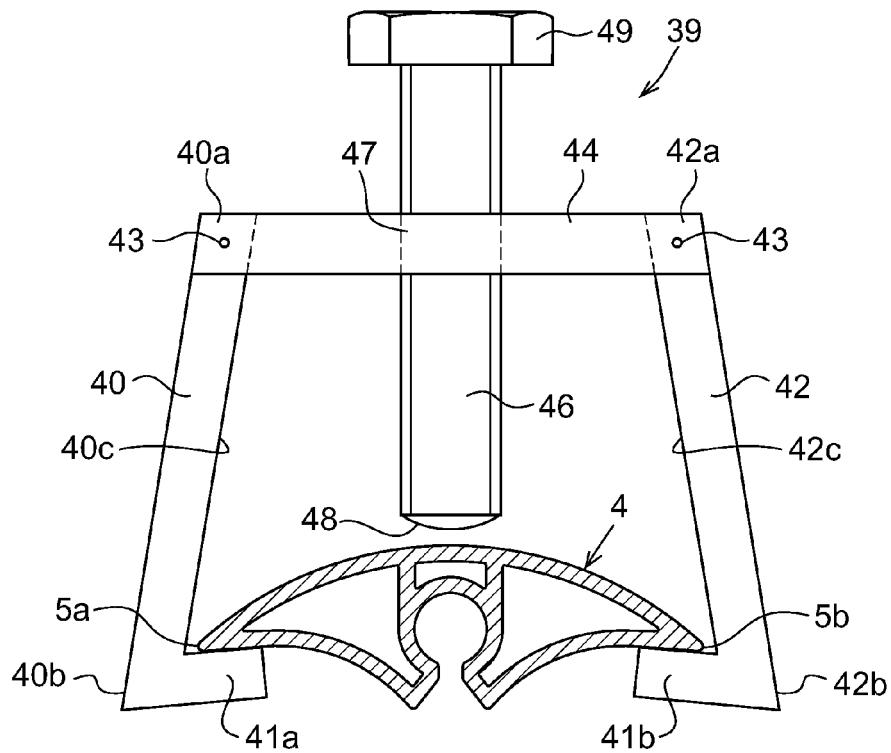
FIGS. 4a-4d illustrate schematically a tool for enabling introduction of a fibre optic cable inside the power cable assembly device shown in FIGS. 1-3.

FIG. 4a shows a tool 39 and a profiled body 4 of the kind shown in FIG. 1. The tool 39 has a pair of arms 40, 42 connected at one end 40a, 42a by means of a hinge 43, respectively, to an interconnection means 44. The opposite ends 40b, 42b of the arms 40, 42 are provided with guide means 41 in the form of hook members shaped to grasp about the edges 5a, 5b of the profile 4 of the power cable assembly device 2.

Centrally between the hinges 43, the interconnection means 44 is provided with a support means 46 via a helical joint 47. The support means 46 is at one end provided with a support portion or member 48 and at the other end with a nut or turning handle 49 for manual operation of the support means 46.

The support means 46 may instead be actuated by e.g. an electric step motor.

The withdrawal tool 39 is now ready to be moved along the longitudinal extension of the profiled body 4, in order to open the slit 15 for introduction of the fibre optic cable 30 into the chamber 16 via the slit.

In order to allow such movement, the material of the whole of or part of the tool 39 is preferably, but not necessarily, made of a low friction material.

Figure 4B:
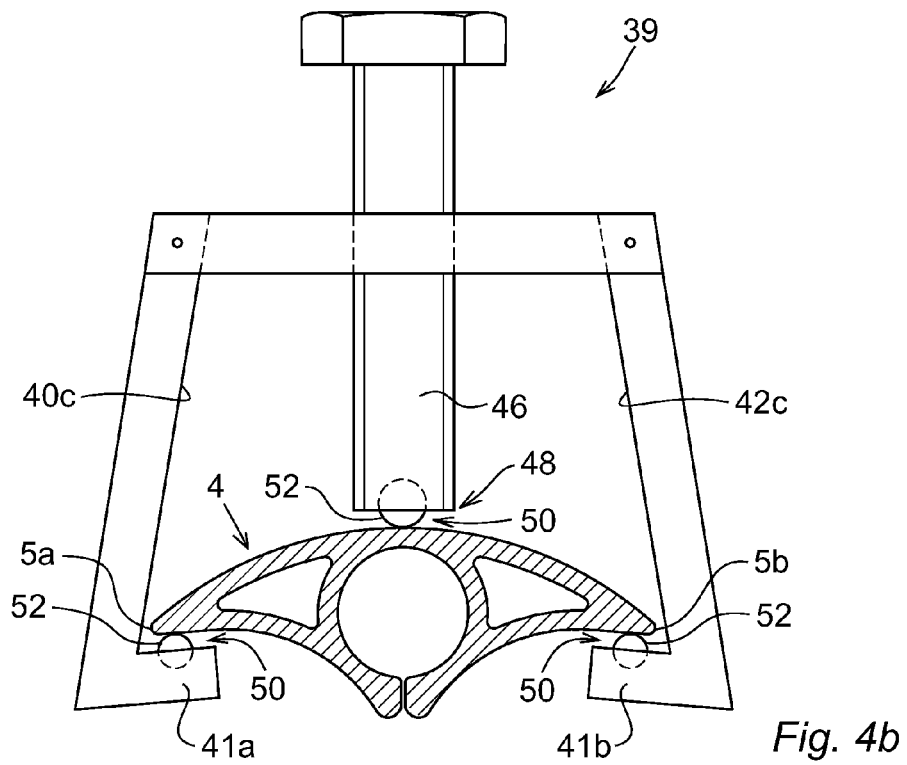

As shown in FIG. 4b, support portion 48 of the support means 46 and the guide means 41 are provided with a friction reducing means 50, in the form of a ball bearing 52 comprising a single ball, in order to allow the withdrawal tool 39 to be moved along the profiled body 4.

Of course, the ball bearing 52 may comprise more than one ball.

Even though FIG. 4b shows the tool 39 together with a profiled body 4 of the kind shown in FIG. 3, it is to be understood that the profiled body 4 of the kind shown in FIG. 1 could be used. Likewise, the profiled body 4 of the kind shown in FIG. 3 could be used together with the tool of FIG. 4a.

Figure 4C:
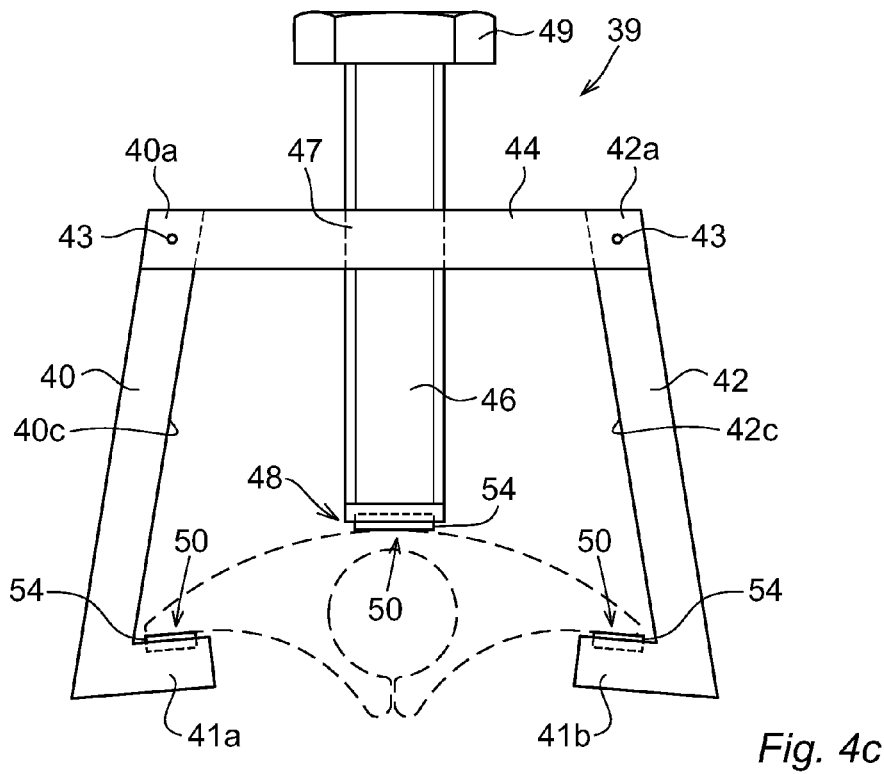

FIG. 4c shows an alternative friction reducing means 50 in the form of a roller bearing 54, having a single roll or wheel.

Of course, the roller bearing 52 may instead comprise more than one roller or wheel.

The profiled body 4 indicated with broken lines may be of the kind shown in FIG. 1 or 3 or of any other kind, having substantially the same shape.

Figure 4D:
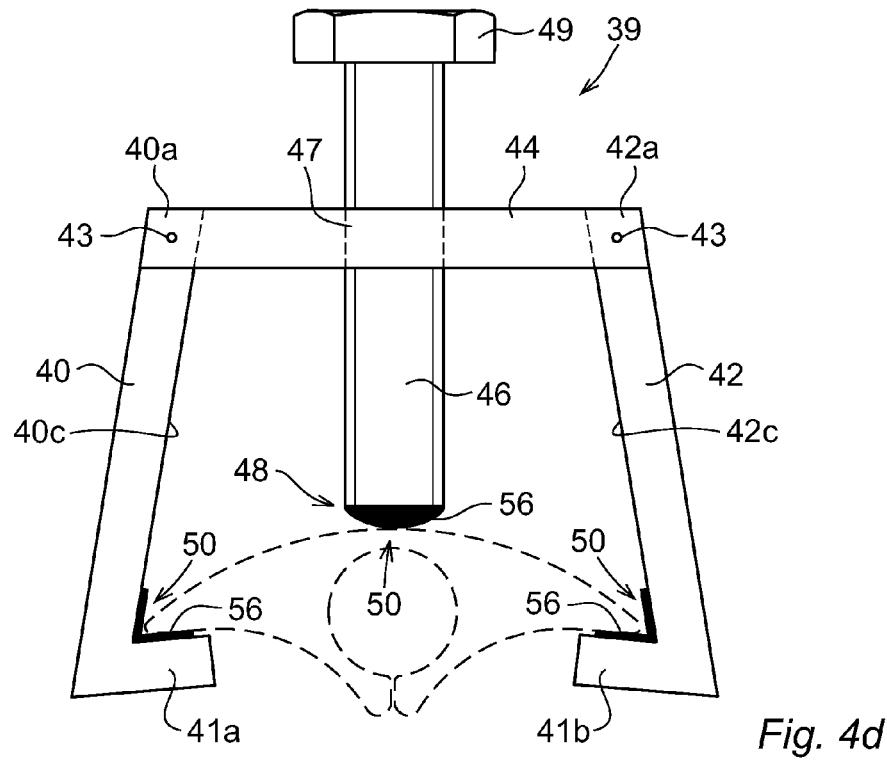

FIG. 4d shows an alternative friction reducing means 50 in the form of a low friction material 56, such as PTFE.

It should be noted that the guide means 41 may be provided with one kind of friction reducing means 50, as shown in FIGS. 4b-4d, or no friction reducing means shown in FIG. 4a, while the support means 46 is provided with none or another kind of friction reducing means shown in FIGS. 4a-4d.

Figure 5:
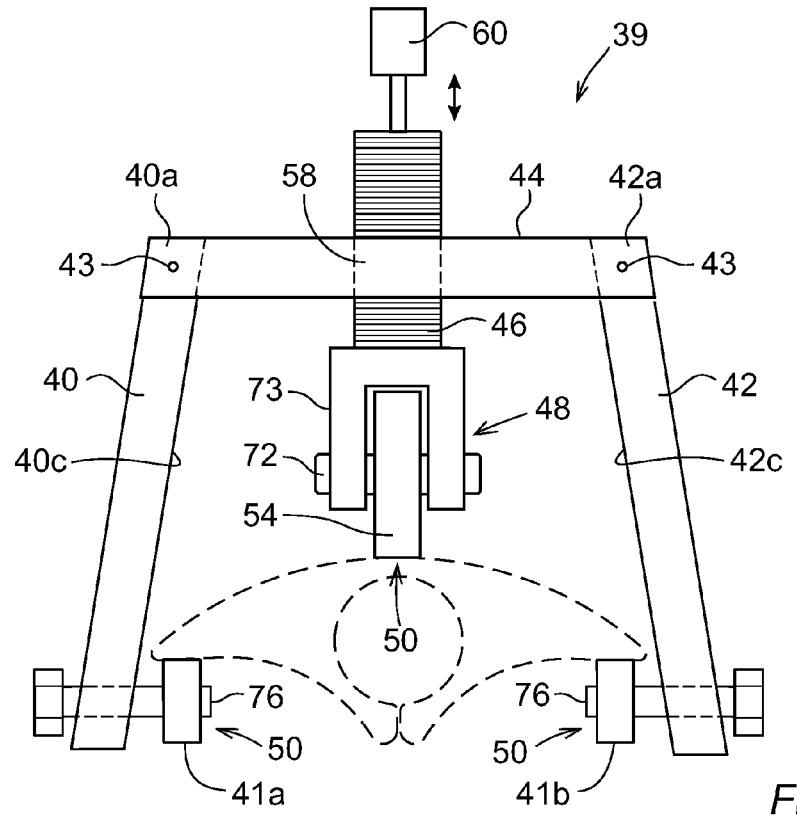
FIGS. 5-8 illustrate schematically alternative tools for enabling introduction of a fibre optic cable inside the power cable assembly device shown in FIGS. 1-3.

FIG. 5 shows a variant of the tool 39, according to which the support means 46 is connected to the interconnection means 44 via a gear rack joint 58, while the pair of arms 40, 42 are connected to the interconnection means 44 by means of hinges 43.

The first and second arms 40, 42 are each provided with guide means 41 in the form of a guide wheel 41a, 41b connected via an axle 76. The support means 46 is provided with a support member 48 in the form of a double encapsulated ball-bearing 54 connected via an axle 72 to a U-shaped bearing support 73.

The support means 46 is actuated by a power source 60, e.g. an electric step motor, a solenoid or a hydraulic or pneumatic cylinder, such that the support means is allowed to move in its longitudinal direction.

Of course, the support means 46 may instead be manually actuated.

In this variant, the guide wheels 41a, 41b of the arms 40, 42 are positioned under the first and second ends 5a, 5b of the profiled body 4 by turning one or two of the arms 40, 42 about the respective hinge 43.

Figure 6:
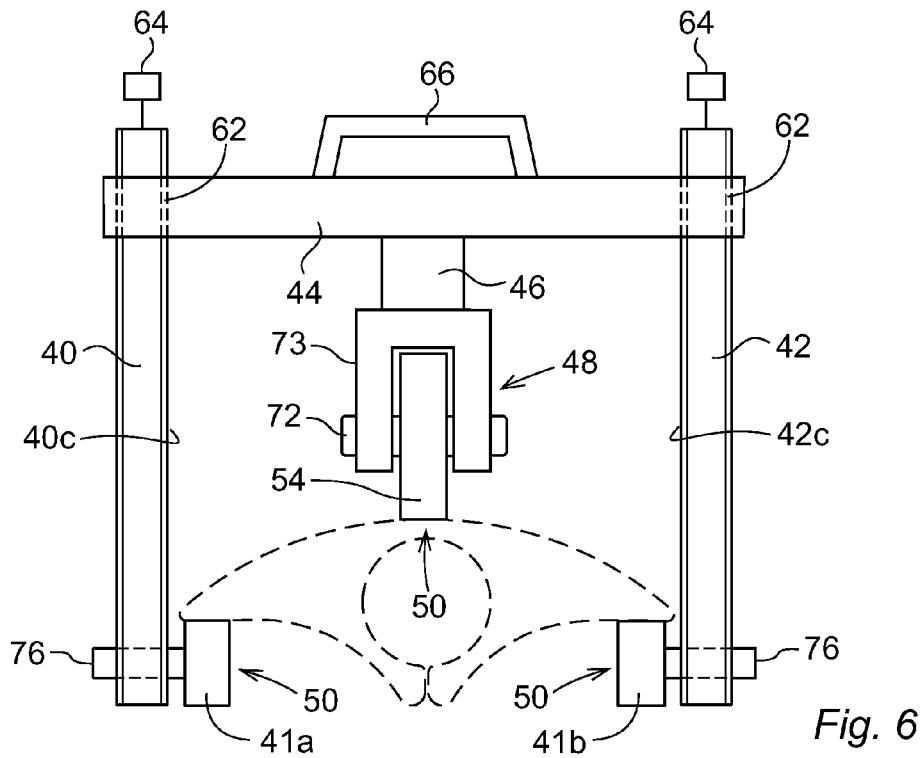

FIG. 6 shows a variant of the tool 39, according to which the first and second arms 40, 42 are connected to the interconnection means 44 via helical joints 62, while the support means 46 is rigidly connected to the interconnection means 44.

The first and second arms 40, 42 are each provided with a guide wheel 41a, 41b via an axle 76, and the support means 46 in the form of a U-shaped bearing support 73 provided with an encapsulated ball-bearing 54 via an axle 72.

The support means 46 is actuated by a power source 60, e.g. an electric step motor, such that the arms 40a, 40b is allowed to move in their longitudinal direction. Of course, the arms could instead be turned manually.

In this variant, the guide wheels 41a, 41b of the arms 40, 42 are positioned under the first and second ends 5a, 5b of the profiled body 4 by turning one or two of the arms 40, 42.

Figure 7:
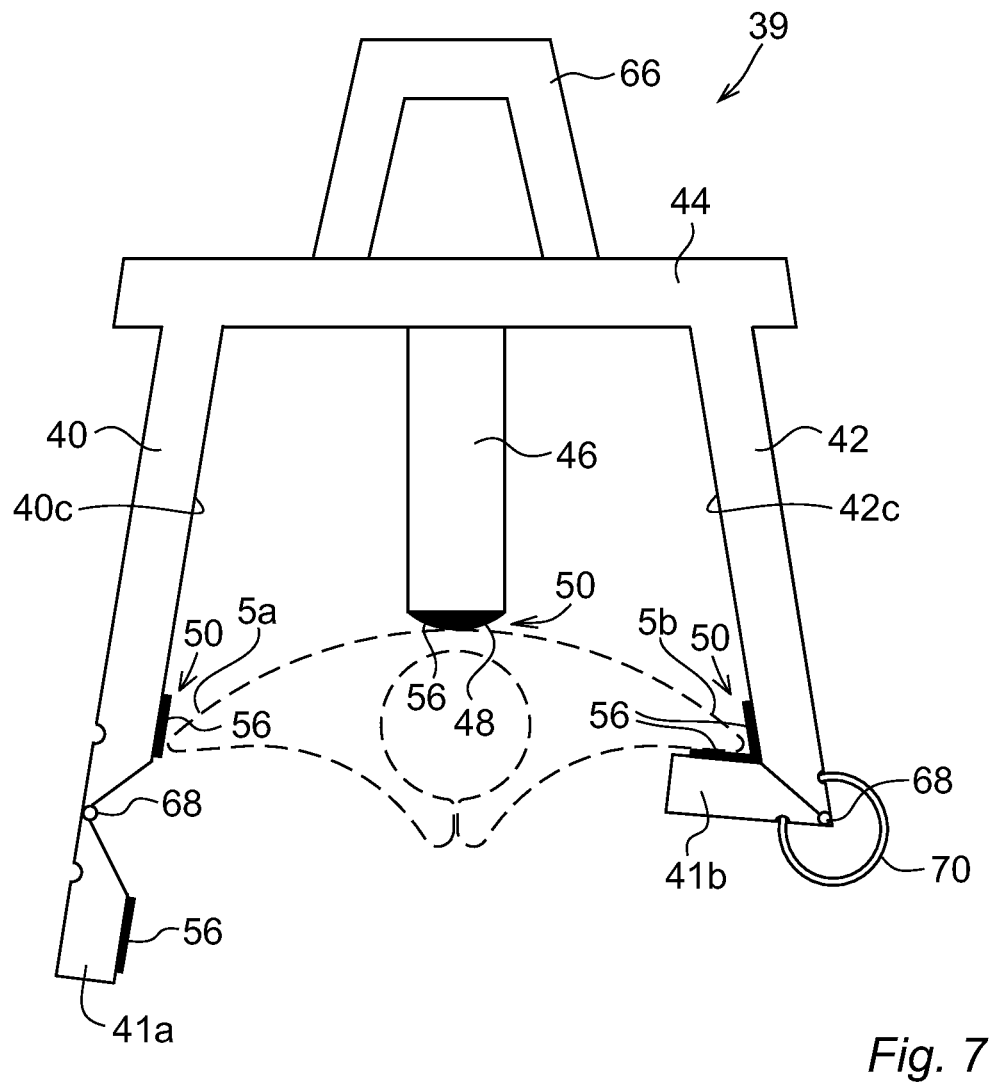

FIG. 7 shows a further variant of the tool 39, according to which the support means 46 as well as the arms 40, 42 are rigidly connected to the interconnection means 44, while the guide means 41 in the form of hooks are pivotably connected to the arms 40, 42 about hinges 68 and further provided with a locking means 70 for facilitating grasping of the guide means 41 behind the edges 5a, 5b of the profiled body 4.

Of course, the guide means 41 and the support means 46 may be provided with no friction reducing means 50 as shown in FIG. 4a, or with any other kind, e.g. as shown in FIGS. 4b and 4c, or a combination thereof, as explained above in connection with FIGS. 4a-4d.

Figure 8:
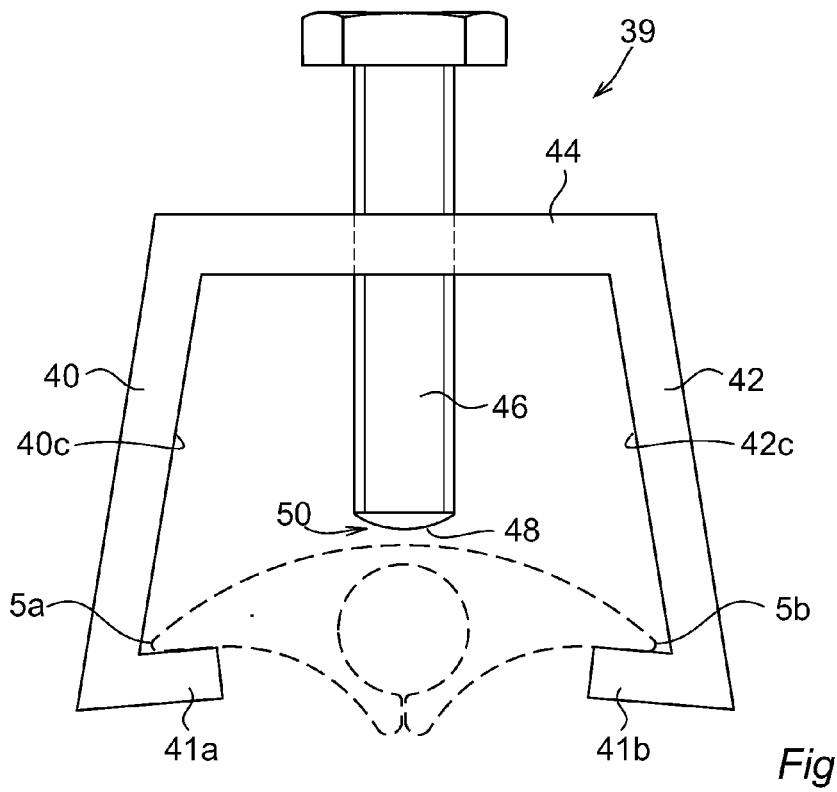

FIG. 8 shows a further variant of the tool 39, according to which the arms 40, 42 are rigidly connected to the interconnection means 44, while the support means 46 is helically movable in relation to the interconnection means 44. In this case, the edges 5a, 5b of the profiled body 4 are manually positioned against the support member 48 and behind the guide means 41, or by means of a separate tool.

The different friction reducing means 50 shown in FIGS. 4b-4d or any combination thereof, are applicable also in this case.

Figure 9A:
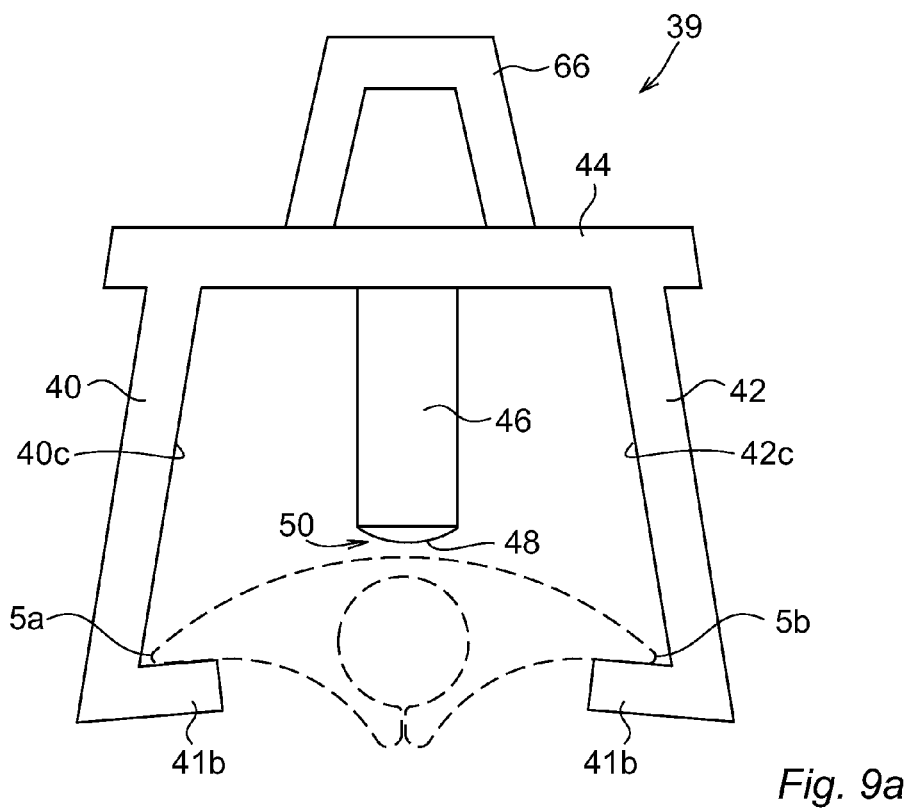
FIG. 9a-9b illustrates an alternative tool and a combined such tool.

FIG. 9a illustrates yet another variant of the withdrawing tool 39, according to which the support means 46 as well as the arms 40, 42 are rigidly connected to the interconnection means 44. Also in this case, the edges 5a, 5b of the profiled body 4 are manually positioned against the support member 48 and behind the support members, or by means of a separate tool.

Figure 9B:
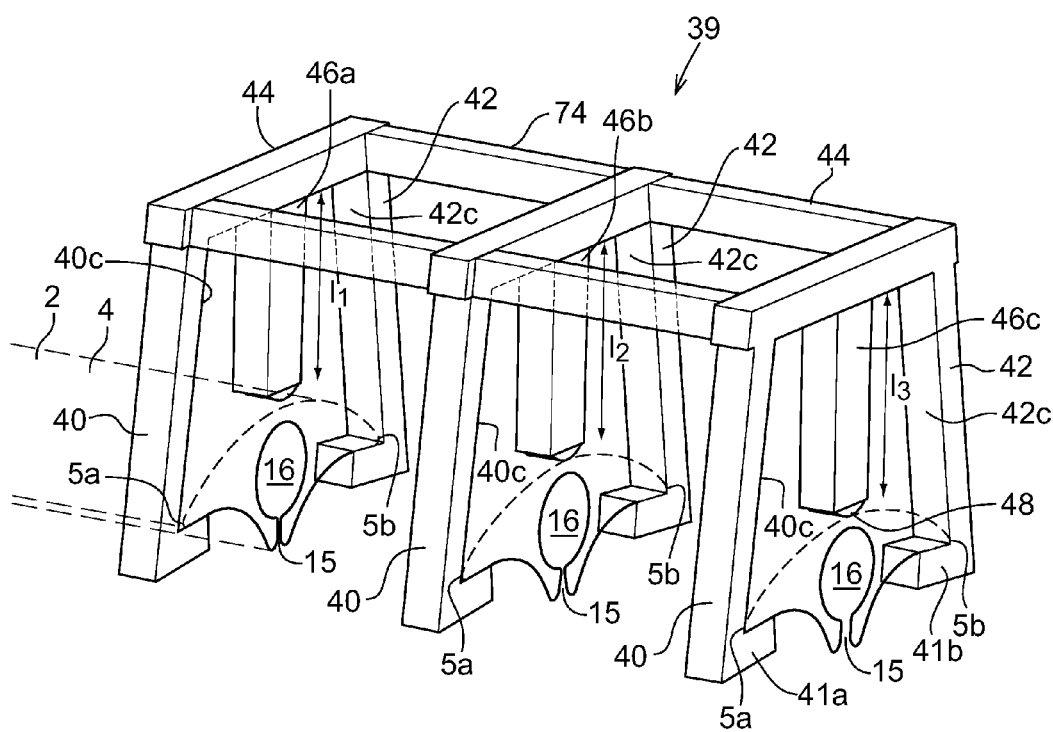

FIG. 9b shows a tool 39 comprising a combination of three tools of the kind shown in FIG. 9a. By means of a frame 74, the three tools are interconnected to one combined tool. In this variant, the support members 46a, 46b, 46c having different lengths, i.e. $l_1 < l_2 < l_3$.

When introducing the profiled body from the left to the right in tool 39 of FIG. 9b, the slit 15 will be gradually opened by the support members, and will thus allow a fibre optic cable 30 to be introduced into the chamber 16 without difficulty. The fibre optic cable (not shown in FIG. 9b) could be introduced to the right in the figure, either by hand or by means of a tool. It should be noted that the tool 30 could be turned upside down. In that case, gravity could be used for introducing the fibre optic cable into the rightmost tool.

It should be noted that the different tools 39 and friction reducing means 50 shown in FIGS. 4b-4d, 5 and 6 or any combination thereof, are applicable in the tool of FIG. 9b

Figure 10A:
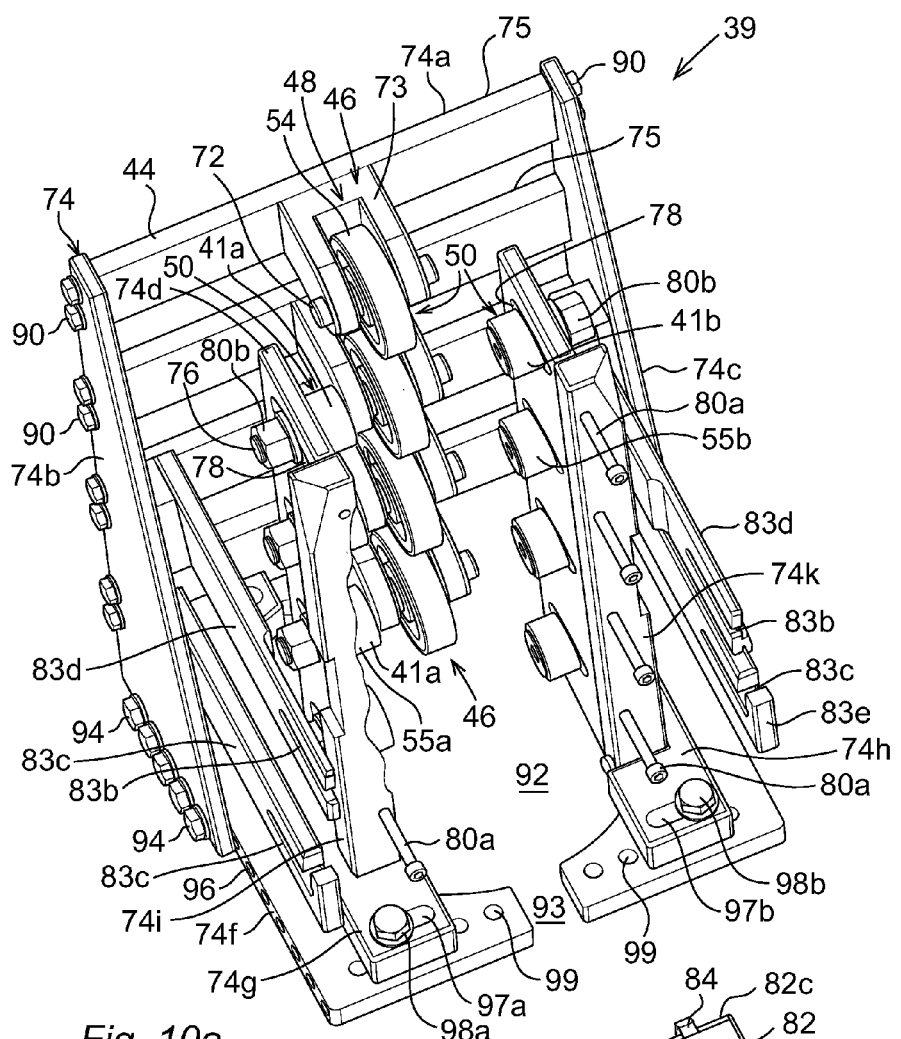
FIGS. 10a-10d illustrate an alternative combined tool.

FIG. 10a shows a further variant of the tool 39 provided with support means 46 comprising four support members 48 in the form of double encapsulated ball-bearings 54. Each ball-bearing 54 is rotatably connected via an axle 72 to a U-shaped bearing support 73 across an axis through the aligned ball-bearings 54. The tool 39 is furthermore provided with guide means in the form of four pairs of guide wheels 41a, 41b of encapsulated needle bearings 55a, 55b, each rotatable about an axle 76, said axle 76 being parallel to the axles 72 of the ball-bearings 54.

In order to position the four ball-bearings 54 in relation to one another and in relation to the guide wheels, the tool 39 comprises a grid of parallel plates 75 of a first frame part 74a of an interconnection means 44 in the form of a frame 74, together forming a grid. Of course, the grid of parallel plates 75 could instead be constituted by a single plate.

The frame further comprises a pair of side walls 74b, 74c, connected perpendicularly to the first frame part 74a by screws 90. The side walls 74b, 74c are furthermore adjustably connected to a frame support 74f by screws 94 in a row of holes 96. In this manner, the first frame part 74a can be moved in a direction across the row of holes 96. Thus, the position of a plane through the axles 72 of the ball-bearings 54 can be adjusted in relation to the guide wheels 41a, 41b, depending on the thickness of the profiled body 4.

The frame support 74f is provided with an entrance opening 92 for introduction of the profiled body 4 into the tool 39. An access slot 93 in the frame support 74e allows for taking the tool 39 apart even if the profiled body 4 is still inside the tool 39.

The frame 74 further comprises a pair of plates 74d, 74e each connected to extension plates 74g, 74h. The plates 74d, 74e are each provided with a slot 97a, 97b in their opposing ends (the rear ends being hidden) for adjustable connection with screws 98a, 98b to a pair of rows of holes 99 in the frame support 74f. Hereby, the frame 74 is adjusted for the lateral dimension of the profiled body 4.

A pair of reinforcement members 74i, 74k are each provided with four sets of screws 80a. Each guide wheel 41a, 41b is independently movable in a slot 78 in the plates 74d, 74e towards a plane through the axles 72 of the ball-bearings 54, and is adjustable in the slot 78 by means of a corresponding set screw 80a. After performed adjustment, the position of the guide wheel 41a or 41b is fixed by means of a lock nut 80b.

The set of screws 80a and lock nuts 80b are adjusted in such a way that each guide wheel 41a, 41b is positioned at a predetermined distance relative to the support member 48. In this way, it is possible to adjust each pairs of guide wheels 41a, 41b relative to the other pairs of guide wheels 41a, 41b to bear against the edges of 5a, 5b of the profiled body 4. By said adjustment, the slit 15 will be widened and thus opened at a predetermined position between the first pair of wheels and the fourth pair of wheels.

Figure 10B:
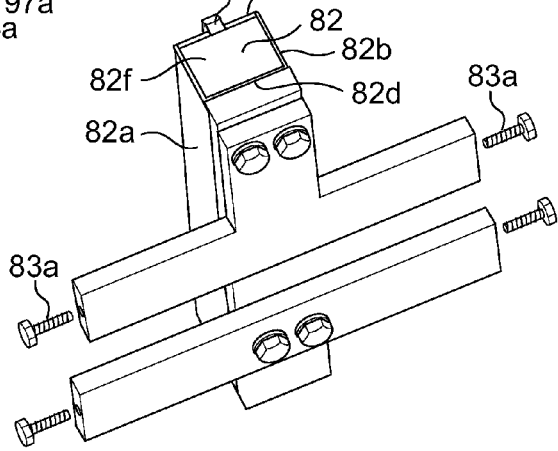

In FIG. 10b is shown an elongated guide beam 82 having lateral sides 82a, 82b, a guide side 82c and a connection side 82d (hidden). The guide beam 82 is to be arranged opposite to and facing the support members 48. The guide beam 82 is provided with an elongated guide member 84 to be positioned parallel to a plane through the axles 72 of the ball-bearings 54, by screws 83a in elongated slits 83b, 83c in two pairs of arms 83d, 83e connected to the side walls 74b, 74c of the frame 74.

Figure 10C:
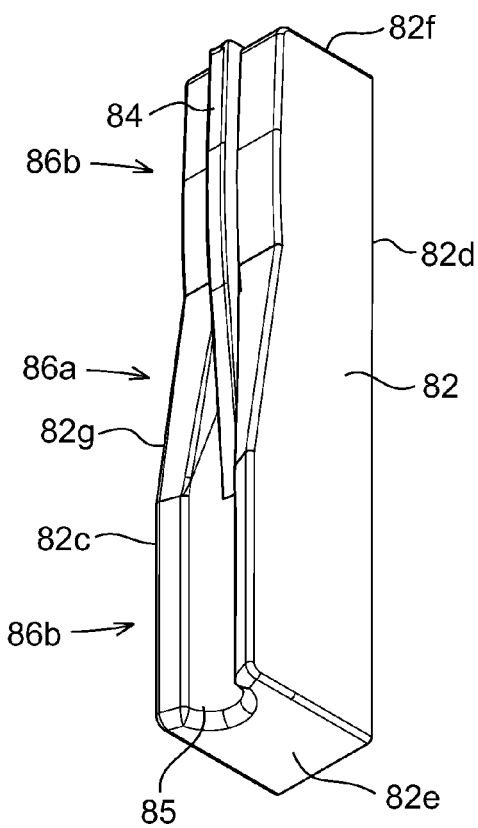

In FIG. 10c is shown the guide beam 82 from the opposite direction. At a first end 82e of the guide beam, an elongated U-shaped guide member 85 is provided, while at a second end 82f, and on the same longitudinal side 82c, an elongated guide member 84 is provided. Between the elongated guide, the U-shaped member 85 and the elongated guide member 84, a transition section 86a is provided between first and second sections 86b, 86c. In the transition section 86a, the lateral extension of the elongated U-shaped member 85, measured from the connection side 82d is reduced in a longitudinal direction from the first section 86b towards the elongated guide member 84. Furthermore, in the transition section 86a the lateral extension of the elongated member 84, measured from the connection side 82d is reduced in a longitudinal direction from the second section 86c towards the U-shaped member 85.

Figure 10D:
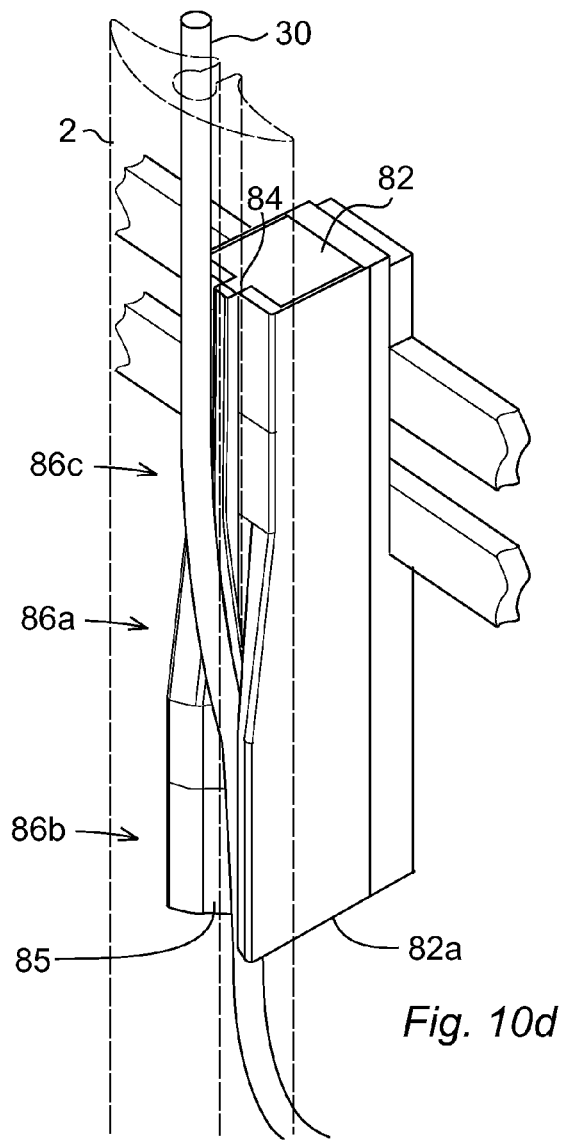

In FIG. 10d is shown that the fibre optic cable 30 is controlled to keep a longitudinal orientation relative to the slit 15 of the profiled body by the U-shaped guide member 85 at the first section 86b extending from the first end 82e to the transition section 86a. It also shows that the fibre optic cable is introduced into the profiled body 4 via slit 15 by the transition section 86a of the diminishing elongated U-shaped guide member 85 and the raising elongated guide member 84, and that the fibre optic cable 30 is guided to stay inside the chamber by the elongated guide member 84 in the section 86c extending from the transition section 86a towards the second end 82f.

Figure 11:
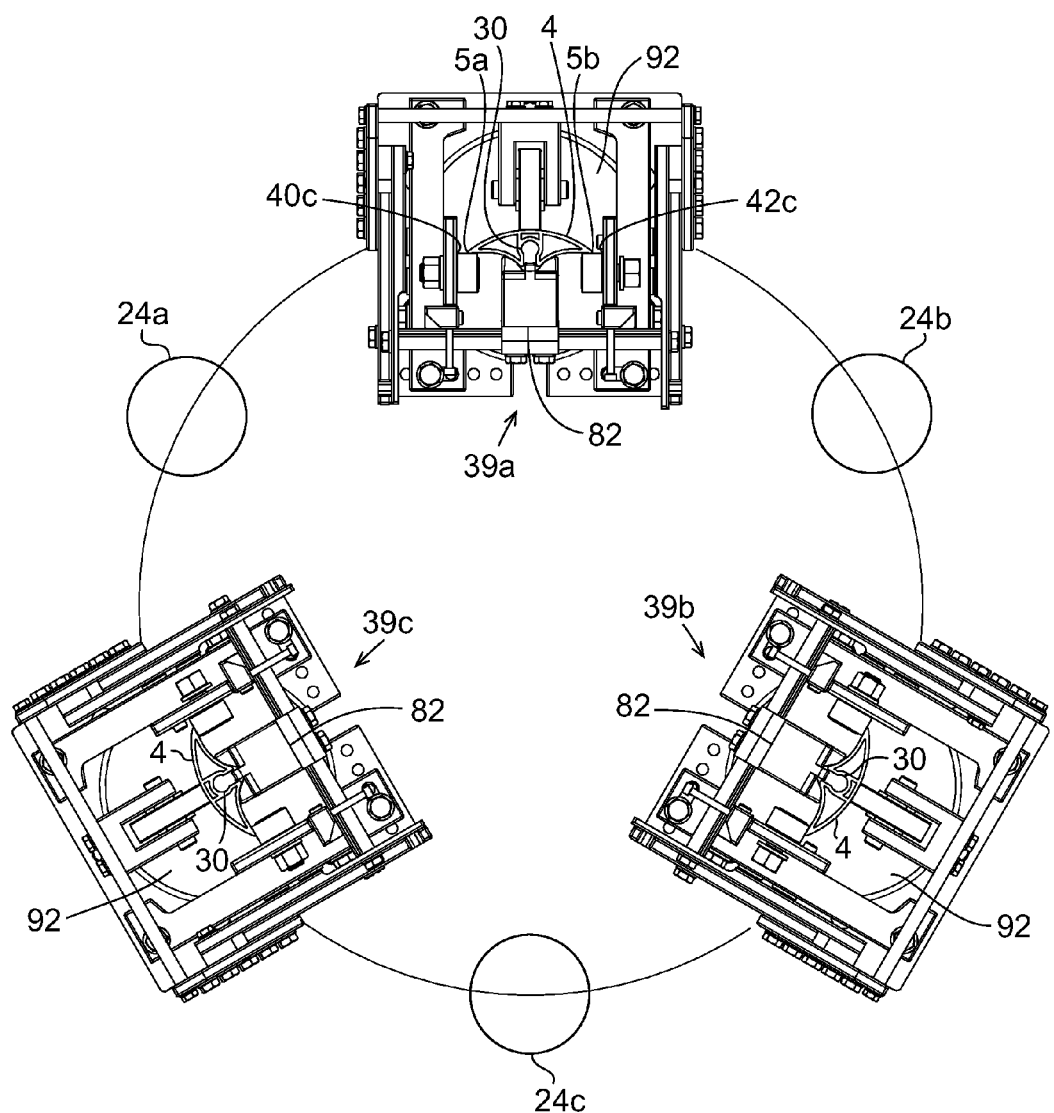
FIG. 11 illustrates a set up of tools in the assembly of a power cable.

FIG. 11 shows the first step of assembly of the power cable.

First, the power cores 24a, 24b, 24c are held 120° in relation to one another by means of not shown equipment in the periphery of an imaginary circle 100.

Then, between the power cores 24a, 24b, 24c three tools 39a, 39b, 39c of the kind shown in FIGS. 10a-c, are arranged 120° in relation to one another in the periphery of the imaginary circle 100 in relation to and between the power cores 24a, 24b, 24c.

As explained above in connection with FIG. 10a, the frame 74 is adjusted for the power cable assembly device 2 to be used, i.e. first frame part 74a is mounted in predetermined holes of the frame support 74f, and the pair of plates 74d, 74e are mounted in predetermined holes 99.

In each tool 39a, 39b, 39c, a profiled body 4 is positioned between the four pairs of guide wheels 41a, 41b, starting from the level of frame support 74f (i.e. seen from the lower part in FIG. 10a) and the four support members 48.

The screws 80a of the first, second and third pairs of wheels 41a, 41b, counted from the frame support 74f, are adjusted such that the slit 15 of the profiled body 4 of FIG. 1 or FIG. 3 is opened somewhat more than the diameter of the fibre optic cable 30, while the fourth pair of wheels 41a, 41b are adjusted to allow the slit 15 to be smaller, such that the width of the slit is less than the diameter of the fibre optic cable 30, but wider than the transversal dimension of the guide member 84.

A fibre optic cable 30 is now introduced via the entrance opening 92 of the frame 74 (cf. FIG. 10a) in each profiled body 30 mounted in the tools 39a, 39b, 39c, and is introduced into the chamber 16 and through the end of the profiled body 4 and temporarily fixed inside the profiled body upon start.

A guide beam 82 of the kind described above is then mounted.

Each profiled body 4 is collected together with the power cores 24a, 24b, 24c at a distance from the tools 39a, 39b, 39c (above the tools as seen in FIG. 10a and FIG. 11) and are assembled while pulling the profiled bodies 4 and power cores 24a, 24b, 24c away from the tools 39a, 39b, 39c.

During this movement, the slit 15 is opened by the support members 48 and the guide members 41, while fibre optic cables 30 are guided into the chamber by the guide beam 82.

It should also be noted that the tools 39a, 39b, 39c may be mounted for introduction of the fibre optic cable 30 through the entrance opening 92 of the frame 74 horizontally or vertically.

In case of high torsional stiffness of the profiled body 4, a higher pressure may have to be applied on one side 8 than the other 10 by the guide wheels 41a, 41b, or a pressure may even only be applied on one side 8 by one or more guide wheels 41a, while a lower or even no pressure may be applied on the other side 10 by one or more guide wheels 41b.

In FIG. 11, the simultaneous introduction of a fibre optic cable 30 into three power cable assembly devices 2 of a power cable 22. However, in case only one or two fibre optic cables 30 are to be introduced into the power cable, the tools 39a, 39b, 39c will still be used as guide tools for the assembly of the cores 24a, 24b, 24c and the power cable assembly devices. The support members 48 and guide wheels 41a, 41b of the tool or tools used only as guide tools will then preferably be adjusted in such a way that the slit of such profiled bodies 4 will not be opened.

It should be noted that the guide beam 82 could instead be divided into three different items, corresponding to the sections 86a, 86b and 86c. Alternatively, the first and second sections 86b, 86c could instead be a pair of wheels with a peripheral shape corresponding to the cross-section of the first and second sections 86b, 86c, respectively.

It should be noted that the encapsulated ball-bearing 54 could be exchanged to an encapsulated roller bearing, having circular cylindrical rollers, or to plain bearings. Likewise, the encapsulated needle-bearings could be exchanged to small ball-bearings or plain bearings. Of course the bearings could also be non-encapsulated.

The invention claimed is:

1. A tool for opening an extruded profiled body of a power cord assembly device, comprising:
   at least one pair of guides; and
   at least one support, said pair of guides and said support being arranged in a frame,
   wherein a first guide of said pair of guides is arranged and shaped to releasably connect to an interconnection area of the profiled body,
   wherein a second guide of said pair of guides is arranged and shaped to releasably connect to a second interconnection area of the profiled body,
   wherein said support is provided with a support member adapted to bear against a portion of a first wall of the profiled body opposite to a slit, and
   wherein a distance of the pair of guides relative to the support is such that the slit is widened in the area of the elongation of the profiled body where the tool is applied, thereby allowing a fibre optic cable to be introduced into a chamber of the profiled body.

2. The tool according to claim 1, wherein said support is rigidly connected to the frame, said pair of guides being movably connected to the frame by of a helical joint, a gear rack joint or a sliding joint.

3. The tool according to claim 1, wherein the first guide and the second guide are provided with a friction reducer adapted to bear against and slide along the profiled body in the vicinity of the first interconnection area and the second interconnection area, respectively, for facilitating movement in a longitudinal extension of the profiled body.

4. The tool according to claim 3, wherein the friction reducer is a movable member.

5. The tool according to claim 4, wherein the movable member is a ball, a roll or a wheel.

6. The tool according to claim 1, wherein said support member is provided with a friction reducer adapted to bear against and slide along an outer surface of the first wall of the profiled body, for facilitating movement in the elongation direction of the profiled body.

7. The tool according to claim 6, wherein the friction reducer is a movable member.

8. The tool according to claim 7, wherein the movable member is a ball, a roll or a wheel.

9. The tool according to claim 1, wherein the number of pairs of guides is at least two, and the number of support members is at least two.

10. The tool according to claim 9, wherein the number of pairs of guides is four, and the number of support members is at least four.

11. The tool according to claim 1, wherein a guide bar is provided for guiding the fibre optic cable into the slit, wherein the guide bar is provided with a guide member a transversal dimension of which being less than a width of the slit.

12. The tool according to claim 11, wherein the guide bar is provided with a U-shaped guide member for controlling the introduction of the fibre optic cable into the slit, said U-shaped guide member being aligned with the guide member having an elongated shape, the guide bar being connected to another frame in front of and facing the guide members, the open part of the U-shaped guide member being turned towards at least one of the support members in such a way that the U-shaped guide member and the elongated guide member are facing the slit of the profiled body introduced between the support members and the pair or guides, the guide bar being positioned in said another frame such that the U-shaped guide member is upstream of the elongated guide member in relation to the direction of movement of the profiled body.

13. A power cable assembly device to be opened by the tool according to claim 1, comprising the profiled body, said profiled body being made of a polymer material and adapted to a cross-sectional shape and elongation of a power cable, said profiled body comprising the chamber and the slit to said chamber, said chamber being adapted to receive a fibre optic cable via said slit.

14. The power cable assembly device according to claim 13,
wherein the cross-section of the profiled body includes a first wall, a second wall and a third wall,
said first wall being convex and having first and second opposite end portions,
said second wall being concave and having third and fourth opposite end portions,
said third wall being concave and having fifth and sixth end portions,
the third end portion of said second wall being connected to said first end portion of said first wall,
the fifth end portion of said third wall being connected to said second end portion of said first wall,
the first wall being adapted to face a jacket of the power cable,
said a second and a third walls being adapted to face a pair of neighbouring power cores, and
wherein the fourth end portion of the second wall and the sixth end portion of the third wall define together a slit to a chamber between said first, second and third walls, said slit extending in the elongation direction of the profiled body for allowing introduction of the fibre optic cable into said chamber.

15. The power cable assembly device according to claim 13, wherein a cross-section of the chamber is substantially annular.

16. The power cable assembly device according to claim 13, wherein said polymer material of the profiled body is PVC or PE.

17. The power cable assembly device according to claim 13, wherein said slit is closed in a mounted state.

18. A power cable assembly device according to claim 15, wherein a diameter of the chamber is in the range of 11-25 mm, more preferably 13-23 mm.

19. The power cable assembly device according to claim 14, wherein the slit is open in a mounted state, and a distance between the fourth end portion of the second wall and the sixth end portion of the third wall defining the slit is in the range of 1 mm-13 mm, more preferably 3-11 mm, even more preferably 4-6 mm, most preferably 5 mm.

20. The power cable assembly device according to claim 19, wherein a diameter of the chamber is in the range of 11-25 mm, more preferably 12-23 mm.

21. The power cable assembly device according to claim 13, wherein a wall thickness of either or all of the second wall, the third wall and a wall defining the chamber has a thickness in the range of 2-6 mm, more preferably 2.5-4 mm, most preferably 3 mm.

22. A method of introducing a fibre optic cable into the power cable assembly device according to claim 14, said method comprising the steps of:
actively or passively applying a pressure on the first wall substantially between the first and second end portions in a direction towards the slit;
actively or passively applying a pressure on at least one of said second and third walls in a direction towards the first wall until the slit is wider than the diameter of the fibre optic cable;
introducing the fibre optic cable through the slit into the chamber;
placing a guide beam along the longitudinal extension of the slit, the guide beam having an elongated guide member with two elongated sides, the lateral dimension of the elongated guide member being less that the diameter of the fibre optic cable;
controlling and guiding the fibre optic cable into the chamber via said slit by a guide bar;
moving the profiled body in relation to guide bar together with the fibre optic cable; and
moving the slit of the profiled body out of the guide bar, the fibre optic cable remaining inside said chamber.

23. The method according to claim 22, whereby the fibre optic cable is controlled to be inserted into the chamber by a U-shaped guide member and is guided to remain inside the chamber by an elongated guide member.

* * * * *